May 22, 1956
D. M. HARVEY
2,746,436
HYDRAULIC VALVE LIFTER MECHANISM
Filed July 20, 1951
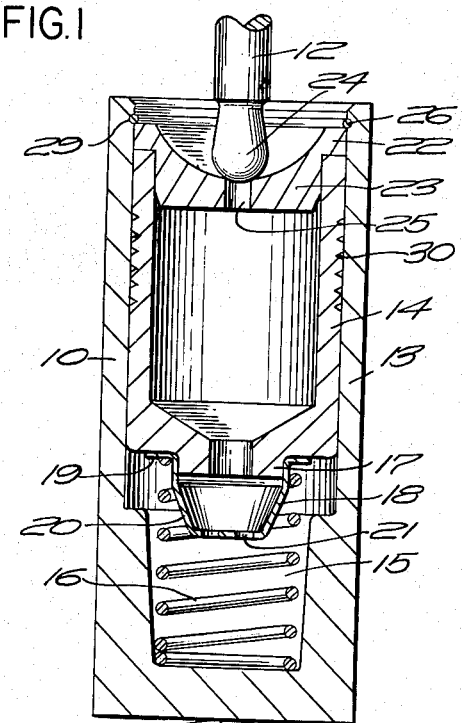
FIG. 1
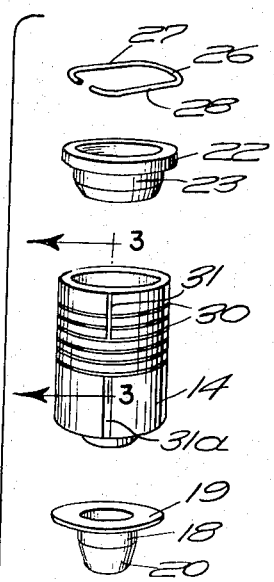
FIG. 2
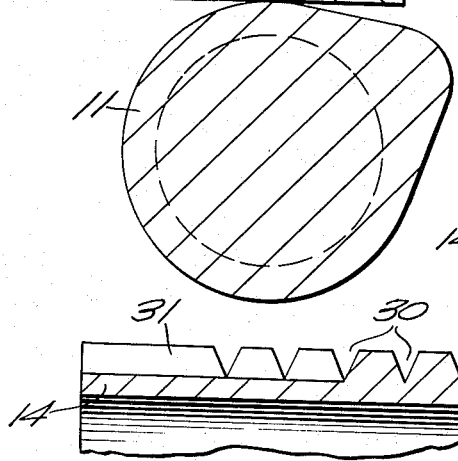
FIG. 3
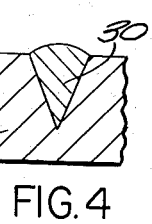
FIG. 4
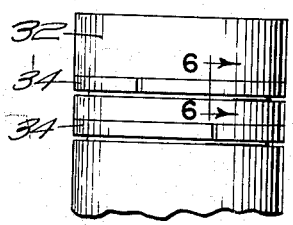
FIG. 5
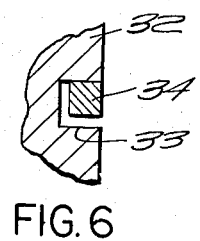
FIG. 6
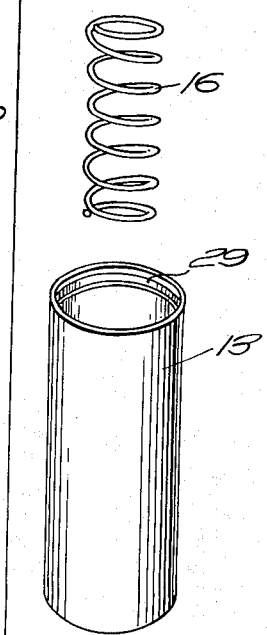
INVENTOR.
Draper M. Harvey
BY Nathaniel Frucht
ATTORNEY

United States Patent Office

2,746,436
Patented May 22, 1956

2,746,436

HYDRAULIC VALVE LIFTER MECHANISM

Draper M. Harvey, Hingham, Mass.

Application July 20, 1951, Serial No. 237,780

5 Claims. (Cl. 123—90)

The present invention relates to the automotive art, and has particular reference to an improvement in the construction of conventional pistons employed in hydraulic valve lifter mechanisms.

The hydraulic valve mechanisms in current use have cylindrical pistons which periodically reciprocate in their cylinders as the valves are actuated. Since a completely cylindrical piston and cylinder do not have capacity to hold lubricating oil, the excessive heat generated between the piston and its cylinder and the dry operation of the lifters causes deposits of oxidized lubricants, rapid wear, and improper functioning of the hydraulic mechanism.

The principal object of the invention is to provide adequate lubrication between the piston and the cylinder of a hydraulic valve lifter mechanism, to assume required surface tensioning for the positive control of hydraulic pressures within the body and piston area.

An additional object of the invention is to provide oil rings, preferably on the cylindrical piston so constructed that lubricating oil is held in the rings and exerts hydraulic pressure against the inner surface of the cylinder.

Another object of the invention is to utilize V grooves on the piston or the contiguous cylinder walls for receiving and retaining lubricating oil.

A further object of the invention is to provide a drain back for the oil rings to ensure complete lubrication of the piston and cylinder walls.

With the above and other objects and advantageous features in view, the invention consists of a novel arrangement of parts more fully disclosed in the detailed description following, in conjunction with the accompanying drawings, and more specifically defined in the claims appended thereto.

In the drawings:

Fig. 1 is a sectional view through an illustrative hydraulic valve lifter having a piston construction embodying the invention;

Fig. 2 is an exploded perspective view of the lifter parts;

Fig. 3 is an enlarged sectional detail of the piston;

Fig. 4 is an enlarged sectional detail showing the oil retaining operation of one oil ring;

Fig. 5 is a detail plan view showing the provision of movable piston rings on the lifter piston; and Fig. 6 is a sectional detail on the line 6—6 of Fig. 5.

Referring to the drawings, the illustrated hydraulic valve lifter 10 is of conventional type, operated by a cam 11 and in turn periodically actuating a valve lifter rod 12. The lifter 10 includes a cylinder 13 in which a piston 14 is yieldingly locked, the cylinder having a lower recess 15 in which a coil spring 16 seats. The piston 14 has a reduced apertured lower flange 17 over which a perforated cup 18 seats, the cup 18 having an upper flange 19 contacting the lower surface of the piston and a depending rounded portion 20 which has a lower opening 21 and seats into the upper coil of the spring 16.

A cap 22 closes the upper end of the piston, and has a depending body 23 with an upper rounded recess 24 in which the lower rounded end of the lifter rod 12 seats, the depending body 23 having an opening 25. A spring lock wire 26 having straight sides 27, 28 is snapped into an annular recess 29 at the upper end of the inner wall of the cylinder 13 to lock the parts together.

The basic problem is to properly lubricate the contiguous walls of piston 14 and the cylinder 13. To this end, I provide the upper end of the piston 14 with a number of V shaped annular grooves 30, and I also provide a longitudinal groove 31, on the upper grooves 30 as a drainback to properly lubricate the inner surface of the cylinder 13. I have found that a square type groove will not provide an oil bearing surface, and that a groove which has parallel sides and a rounded inner surface provides only a minor oil bearing surface; a V cut, on the other hand, provides an oil bearing surface which extends outwardly and over the entire angle and the root of the V cut, whereby a very effective lubrication is obtained.

I have described the V grooves as applied to the piston surface, as such construction is readily manufactured; but the V grooves, and the drain back, may be applied to the inner surface of the cylinder, or, if desired, to the contiguous surfaces of both the piston and the cylinder. Since there is a reciprocating movement of the lifter cylinder 13 in its guide holder in response to the rotation of cam 11, it may be desirable for certain automotive uses to also provide the lifter cylinder with oil grooves and a drain back longitudinal groove similar to the grooves 30 and 31 in Fig. 3.

The root diameter of the longitudinal groove 31 is determined by the degree of hydraulic resistance which is required to make the lifter mechanism operative under the load factors imposed by the construction of the entire engine valve train or assembly, it being preferred to extend the drain groove longitudinally to the top of the piston or cylinder.

A drain groove may also be provided extending from the base V groove 30 to the lower section of the piston 14, as indicated at 31a in Fig. 2, the groove 31a having a somewhat deeper root and a wider width than the drain groove 31, to provide an initial priming of the V grooves 30 and the displacement of any oil excess through the groove 31 as a restricted channel, whereby the required hydraulic pressures are developed by a static head during compression and without interference with normal lubrication of the contiguous cylindrical surfaces of the piston and cylinder during their relative reciprocating motions.

The described V groove construction has been found effective for lubricating standard hydraulic valve lifter mechanisms, but it may be desirable for some types of engines to utilize piston-ring type oil reservoirs such as are illustrated in Figs. 5 and 6, the piston 32 having at least one annular oil retaining groove 33 in which a piston ring 34 is movably seated.

The above described lubricating arrangements maintain an adequate body of lubricating oil between the piston and the cylinder under all operating conditions, and exert a positive control of the range of expansion of the piston and cylinder and the surface conditions resulting from high temperatures accumulated by the piston load action and the working pressures.

Although I have described specific embodiments of my invention, it is obvious that changes in the size, shape and arrangement of the parts may be made to meet the lubricating requirements of different hydraulic valve lifter designs, without departing from the spirit or the scope of the invention as defined in the appended claims.

I claim:

1. In a hydraulic valve lifter mechanism, a cylinder, a piston movably mounted therein, means for supplying lubricating oil to the contiguous surfaces thereof, and means comprising spaced parallel annular V grooves and a drain back channel on one surface for maintaining a lubricating oil film therebetween.

2. In a hydraulic valve lifter mechanism, a cylinder, a piston movably mounted therein, means for supplying lubricating oil to the contiguous surfaces thereof, and means comprising spaced parallel annular V grooves and a drain back channel on the piston surface for maintaining a lubricating oil film therebetween.

3. In a hydraulic valve lifter mechanism, a cylinder, a piston movably mounted therein, and means for supplying lubricating oil to the contiguous surfaces thereof, the piston surface having spaced parallel annular V grooves and having a feed channel extending axially of the piston from at least one of the grooves and terminating at the upper end of the piston.

4. In a hydraulic valve lifter mechanism, a cylinder, a piston movably mounted therein, and means for supplying lubricating oil to the contiguous surfaces thereof, the piston surface having spaced parallel annular V grooves and having a drain channel extending axially of the piston from at least one of the grooves and terminating at the lower end of the piston.

5. In a hydraulic valve lifter mechanism, a cylinder, a piston movably mounted therein, and means for supplying lubricating oil to the contiguous surfaces thereof, the piston surface having spaced parallel annular V grooves and having a feed channel extending axially of the piston from at least one of the grooves and terminating at the upper end of the piston, and a drain channel extending axially of the piston from at least one of the grooves and terminating at the lower end of the piston.

References Cited in the file of this patent

UNITED STATES PATENTS

| | | |
|---|---|---|
| 837,680 | Goehns | Dec. 4, 1906 |
| 1,426,694 | Weidenfeller | Aug. 22, 1922 |
| 2,158,730 | Russell | May 16, 1939 |
| 2,213,195 | Banker | Sept. 3, 1940 |
| 2,247,278 | Daisley | June 24, 1941 |
| 2,676,579 | Gerner | Apr. 27, 1954 |

FOREIGN PATENTS

| | | |
|---|---|---|
| 344,042 | Great Britain | Mar. 2, 1931 |